United States Patent
Mattela et al.

[19]

[11] Patent Number: 6,052,522

[45] Date of Patent: Apr. 18, 2000

[54] METHOD AND APPARATUS FOR EXTRACTING DATA STORED IN CONCATENATED REGISTERS

[75] Inventors: Venkat Mattela, San Jose; Danielle Lemay, Sunnyvale, both of Calif.

[73] Assignee: Infineon Technologies North America Corporation, San Jose, Calif.

[21] Appl. No.: 08/961,384

[22] Filed: Oct. 30, 1997

[51] Int. Cl.$^7$ .............................. G06F 12/02; G06F 7/16; G06F 17/50

[52] U.S. Cl. ........................ 395/500.34; 395/565

[58] Field of Search ................ 395/500, 500.34, 395/565

[56] References Cited

U.S. PATENT DOCUMENTS

| | | | |
|---|---|---|---|
| 4,139,899 | 2/1979 | Tulpule et al. ........................ | 395/565 |
| 4,467,444 | 8/1984 | Harmon, Jr. et al. . | |
| 4,495,598 | 1/1985 | Vahlstrom et al. . | |
| 5,295,250 | 3/1994 | Komoto et al. . | |
| 5,327,543 | 7/1994 | Miura et al. ............................ | 395/565 |
| 5,751,614 | 5/1998 | Cohen ................................ | 364/716.02 |
| 5,826,071 | 10/1998 | Narayan ................................ | 395/565 |
| 5,835,793 | 11/1998 | Li et al. ................................ | 395/898 |

FOREIGN PATENT DOCUMENTS 0 307 166 A3   6/1988   European Pat. Off. .

OTHER PUBLICATIONS

"Multiprecision Barrel Shifter" IBM Technical Disclosure Bulletin, vol. 32, No. 9A, Feb. 1990, pp. 334–337.

*Primary Examiner*—Kevin J. Teska
*Assistant Examiner*—Hugh Jones

[57] ABSTRACT

A method for extracting n bits out of a data word stored in two concatenated registers each having a bit size of n bits starting with the m-th bit of the data register, m being smaller than n, comprises the following steps: The m significant bits of the first register are replaced with the m significant bits of the second register. Then, the result is stored in a register. Finally, the content of this register is rotated by m bits.

5 Claims, 1 Drawing Sheet

METHOD AND APPARATUS FOR EXTRACTING DATA STORED IN CONCATENATED REGISTERS

BACKGROUND OF THE INVENTION

The present invention relates to a method and apparatus for extracting data. Such a method and apparatus are usually used in any kind of microprocessors or micro controllers. Internally, data are represented in different registers of the register file of a microprocessor or micro controller. A 32-bit microprocessor can have a register file containing, for example, thirty-two 32 bit wide registers. For many purposes, 32 bits are not enough to represent a specific data. Therefore, for example, two registers are concatenated to form a 64-bit register. For processing data having this specific data size of 64 bits, special instructions are provided. One of these instructions is the so-called extracting instruction which provides the ability to extract a certain number of bits out of a data word represented by two or more registers. Such an instruction is, in particular, used to normalize data, for example, the result of a DSP filter accumulation.

FIG. 1 shows a diagram representing the effect of an extracting instruction. Numerals 1 and 2 indicate registers which are concatenated to form a single 64-bit data register. Therefore, each register 1 and 2 has a width of 32 bits. The extracting instruction is able to extract 32 bits of the 64-bit word and store it in a register 3 representing the result of the operation. As mentioned above, the extracting instruction concatenates two data register sources to form a 64-bit value from which 32 consecutive bits are extracted. Such an operation can be thought of as a left shift by the number of bits followed by the truncation of the least significant 32 bits of the result. The value of the number of bits comes from either a data register or from an immediate data stored within the instruction. Therefore, such an instruction usually has up to four parameters indicating the registers containing the 64-bit value, a parameter indicating the value of the position of the extracting word within the 64-bit register, and a register to write the result to.

As mentioned before, such an extracting instruction can be used to normalize the result of a digital signal processor filter accumulation in which a 64-bit accumulator is used for several guard bits. The value of the position within the 64-bit accumulator can be determined by using the count leading signs instruction. The extracting instruction can also be used to perform a multi-bit rotation by using the same source register for both of the sources that are concatenated.

U.S. Pat. No. 5,295,250 shows a microprocessor with a barrel shifter. The barrel shifter serves as a shift unit which is controlled by a microprogram and operated by micro instructions for performing extraction, insertion and comparison of consecutive bit strings in word data.

To perform such an instruction, usually a shifter having the size of the respective register is necessary. In FIG. 1, it is assumed that the word to be extracted starts at bit position 21 and ends at bit position 53. A 64-bit shifter would therefore be necessary to shift the content of the 64-bit register 1, 2 by 10 bits to the left and store the result in register 3. FIG. 1 of U.S. Pat. No. 5,295,250 shows such an arrangement whereby numeral 104 indicates the barrel shifter.

SUMMARY OF THE INVENTION

A 64-bit shifter requires a large amount of silicon area. It is therefore the object of the present invention to provide a method and apparatus for extracting data which simplifies the hardware required to perform such an instruction. This object is achieved by replacing the m significant bits of the first register with the m significant bits of the second register, whereby the data word is stored in two concatenated registers. Then, the result is stored in a register and its content is rotated leftwards by m bits.

An apparatus for extracting n bits out of a data word stored in two concatenated registers, each having a bit size of n bits starting with the m-th bit of the data register, whereby m being smaller than n comprises a first and second register containing the data word, a third register indicating the start location of the extracted data, and a logical combining circuit for replacing the m significant bits of the first register with the m significant bits of the second register. The logical combining circuit is connected to the registers. Furthermore, an n bit shift forward/rotate means are provided and connected to the logical combining register.

The present invention uses the existing resources of the arithmetic logic unit of a microprocessor to perform the above-mentioned extracting instruction without requiring any additional hardware, in particular a 64-bit shifter.

DESCRIPTION OF THE PREFERRED EMBODIMENT

Figure 1:
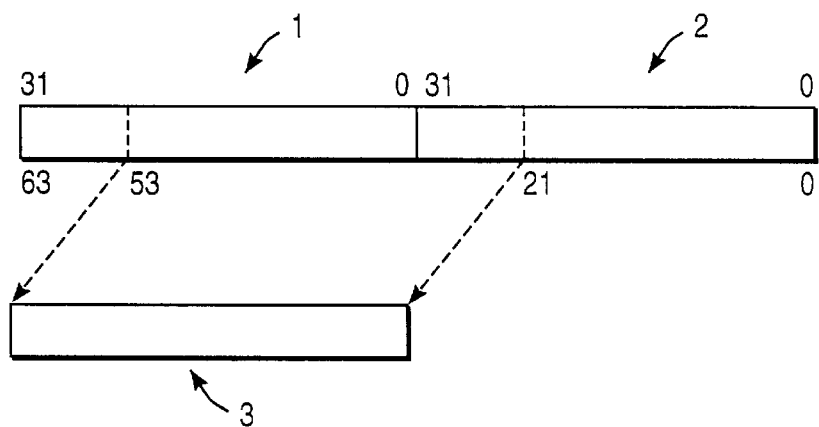
FIG. 1 shows a diagram representing an extracting instruction.
Figure 2:
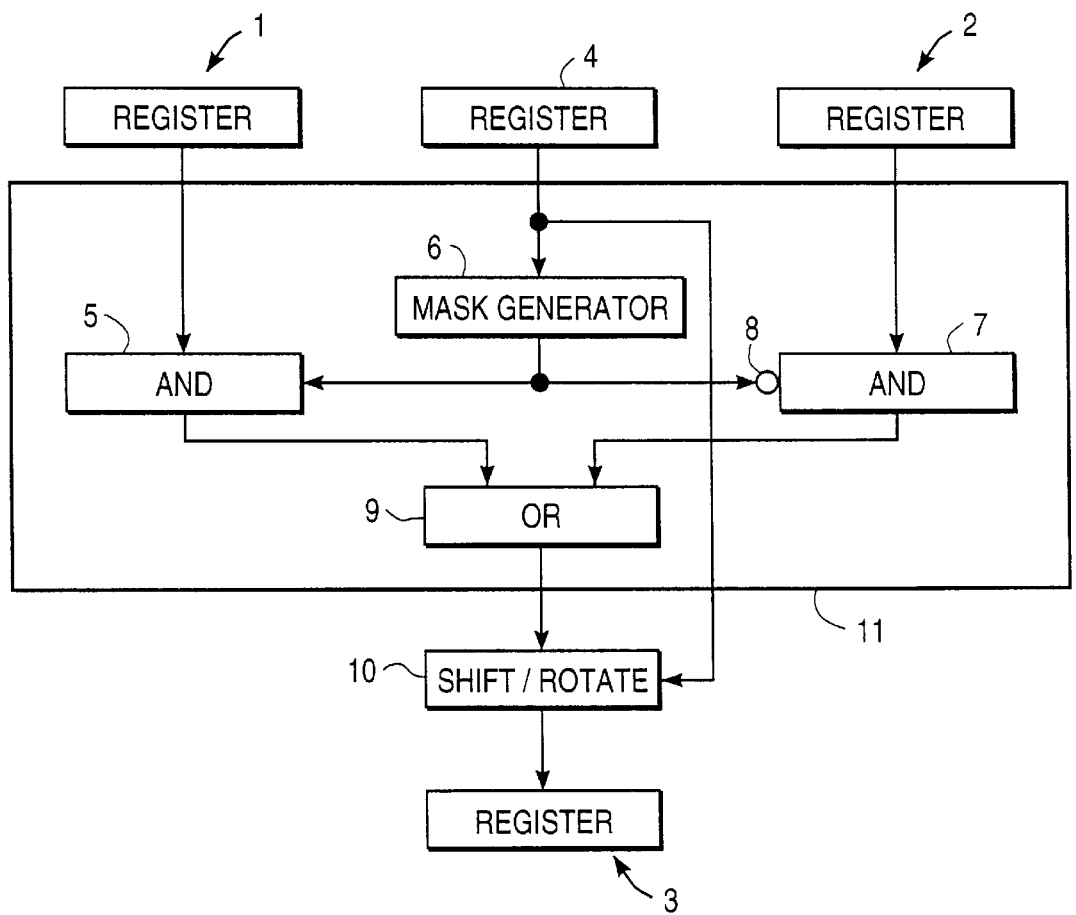
FIG. 2 shows a block diagram representing the hardware which is required to perform an extracting instruction according to the present invention.

FIG. 2 shows a block diagram containing those elements which are necessary to perform an extracting instruction. Two 32-bit registers 1 and 2 are concatenated and form a 64-bit register. Another register 4 is provided which contains a constant indicating the position in between the 64-bit register of the 32-bit data word which is to be extracted. All three registers 1, 2 and 4 are connected to a logical combining circuit 11. The logical combining circuit 11 contains a mask generator 6, the input of which is connected to register 4. Furthermore, two and operators 5 and 7 are provided. And operator 5 has two inputs, the first input is connected to register 1 and the second input is connected to the output of mask generator 6. The second and operator also has two inputs. The first input of the and operator 7 is connected to register 2, the second input is connected to the output of an inverter 8 whose input is connected to the output of the mask generator 6. Finally, an OR operator 9 is provided which comprises two inputs, and one output. The first input of OR operator 9 is connected to the output of and operator 5 and the second input of OR operator 9 is connected to the output of and operator 7. The output of OR operator 9 forms the output of the logical combining circuit 11. A shift/rotate register 10 having an input, an output, and a control input is provided. This shift/rotate register can be, for example, a barrel shifter. The input of shift/rotate register 10 is connected to the output of OR operator 9. The control input of shift/rotate register 10 is coupled with the output of register 4. Finally, a register 3 is provided which is connected to the output of shift/rotate register 10 and contains the result of the extracting operation.

In this preferred embodiment, the extracting instruction may be represented by a mnemonic DEXTR followed by four parameters. The first parameter indicates the target register into which the result is written. The second and third parameter indicate the two registers which form the 64-bit register. The fourth parameter can be a register or a constant indicating the position of the 32-bit word within the 64-bit register.

To show the operation of the extracting instruction according to the present invention, it is assumed that the registers have the following content: register 1="A537A549"; register 2="B0B0B0B0"; register 4="0000000A". All contents of the registers are hexadecimal. As each register is 32 bits wide, only the bottom 5 bits of register 4 are used in this embodiment. Since the shift value in register 4 is 10, the result which will be written into register 3 is equal to 32 bits of the 64 bit register 1 and 2, starting with bit 53 as the most significant bit and ending with bit 21 as the least significant bit.

The following explains the operation of the hardware according to FIG. 2, step-by-step. Register 4 is supplied to the mask generator 6 which generates a mask containing "003FFFFF". In other words, the first 10 most significant bits are set to zero and the rest of the bits to one. This mask is ANDed with the content of register 1 to create "0037A549", while the inverse of the mask, which will be "FFC00000", is ANDed with the content of register 2 to create "B0800000". These two intermediate results which are accessible at the outputs of the two and operators 5 and 7 are then ORed by the OR operator 9 to create "B0B7A549". This intermediate result which is accessible at the output of OR operator 9 is then fed to the input of shift/rotate register 10. The shift/rotate register 10 is controlled by the content of register 4 which indicates in this example that the content of shift/rotate register 10 is to be shifted leftwards 10 times. To perform the proper operation, the shift/rotate register operates as a rotate register which rotates the content leftwards a number of times as indicated by the control input. In other words, the 32-bit rotate register 10 produces the result "DE9526C2", which is stored in register 3.

Since this solution according to the preferred embodiment uses only a 32-bit shifter and mask generator, the area impact of implementing and extracting instruction is mitigated. Compared to a solution using a 64-bit shifter, this solution, according to the present invention, is consuming at least only half the area of silicon. Since less logic is used, transient power consumption is reduced. Another advantage of the present invention is that a small shifter results in faster execution because fewer levels of multiplexer stages are used to build the barrel shifter.

We claim:

1. Method for extracting n bits out of a data word stored in two concatenated registers each having a bit size of n bits starting with the m-th bit of the data register, m being smaller than n, comprising the steps of:

replacing the m significant bits of the first register with the m significant bits of the second register, storing the result in a register, and rotating the content of said register by m bits.

2. Method according to claim 1, wherein the replacing of the m significant bits comprises the steps of:

generating a mask which comprises m bits of a first kind and m minus n bits of a second kind, combining the mask with the first register by a boolean operation, combining the inverted mask with the second register by a boolean operation, and combining the two registers by a boolean operation.

3. Apparatus for extracting n bits out of a data word stored in two concatenated registers each having a bit size of n bits starting with the m-th bit of the data register, m being smaller than n, comprising:

a first and second register containing the data word, a third register indicating the start location of the extracted data, a logical combining circuit for replacing the m significant bits of the first register with the m significant bits of the second register having inputs and one output, said inputs of said logical combining circuit being connected to said registers, and a n-bit shift/rotate means having an input and an output and a control input, said input being connected to said output of said logical combining register and said control input being coupled with said third register.

4. Apparatus according to claim 3, wherein said logical combining circuit comprises:

a mask generator having an input and an output, said input being connected to said third register, a first AND-operator with inputs and an output, said inputs being connected to said first register and to said output of said mask generator, a second AND-operator with inputs and an output, one input being connected to said second register and the other input being fed by the inverted output signal of said mask generator, an OR-operator having inputs and an output, said inputs being connected to said outputs of said first and second AND-operators, and a shift/rotate means having an input, an output, and a control input, said input being connected to said output of said OR-operator.

5. Apparatus according to claim 4, wherein the boolean operators and the shift/rotate means are part of an arithmetic logic unit of a microprocessor.

* * * * *